US009375024B2

(12) United States Patent
Bernaert et al.

(10) Patent No.: US 9,375,024 B2
(45) Date of Patent: Jun. 28, 2016

(54) PROCESS OF PRODUCING COCOA SHELL POWDER

(71) Applicant: Barry Callebaut AG, Zurich (CH)

(72) Inventors: Herwig Bernaert, Lebbeke-Wieze (BE); Ive De Ruysscher, Lebbeke-Wieze (BE)

( * ) Notice: Subject to any disclaimer, the term of this patent is extended or adjusted under 35 U.S.C. 154(b) by 0 days.

(21) Appl. No.: 13/927,586

(22) Filed: Jun. 26, 2013

(65) Prior Publication Data

US 2013/0302473 A1 Nov. 14, 2013

Related U.S. Application Data

(63) Continuation-in-part of application No. PCT/CH2012/000277, filed on Dec. 20, 2012.

(30) Foreign Application Priority Data

Dec. 23, 2011 (GB) .................................... 1122368.2
Mar. 30, 2012 (GB) .................................... 1205847.5

(51) Int. Cl.
| *A23G 1/00* | (2006.01) |
| *A23G 1/56* | (2006.01) |
| *A23L 1/234* | (2006.01) |
| *A23L 1/27* | (2006.01) |

(52) U.S. Cl.
CPC ............ *A23G 1/0006* (2013.01); *A23G 1/0009* (2013.01); *A23G 1/56* (2013.01); *A23L 1/234* (2013.01); *A23L 1/27* (2013.01)

(58) Field of Classification Search
None
See application file for complete search history.

(56) References Cited

U.S. PATENT DOCUMENTS

| 2,698,823 | A | * | 1/1955 | Bersworth et al. ............. 514/566 |
| 2,846,317 | A | * | 8/1958 | Bersworth et al. ............. 426/271 |
| 2,847,308 | A | | 8/1958 | Bersworth et al. |
| 2,875,129 | A | * | 2/1959 | Bersworth et al. ............. 514/566 |
| 3,392,027 | A | * | 7/1968 | Hess ............................... 426/45 |
| 4,156,030 | A | | 5/1979 | Eggen |
| 4,281,027 | A | * | 7/1981 | Inoue et al. .................... 426/631 |
| 4,343,818 | A | * | 8/1982 | Eggen ............................ 426/45 |
| 4,464,403 | A | * | 8/1984 | Leshik ..................... A23L 1/187 426/271 |
| 5,849,353 | A | | 12/1998 | Baker et al. |
| 2006/0090654 | A1 | * | 5/2006 | Mange ................. A23G 3/0063 99/494 |
| 2007/0292577 | A1 | * | 12/2007 | Kopp et al. .................... 426/518 |
| 2009/0047411 | A1 | * | 2/2009 | Houston ........................ 426/632 |
| 2011/0151098 | A1 | | 6/2011 | Chronopoulos et al. |

FOREIGN PATENT DOCUMENTS

| EP | 0 068 229 B1 | 8/1985 |
| EP | 1 733 624 A1 | 12/2006 |
| EP | 1 728 434 | 12/2008 |
| EP | 2 174 555 A1 | 4/2010 |
| EP | 2 174 557 A1 | 4/2010 |
| ES | 2 099 676 | 5/1997 |

(Continued)

OTHER PUBLICATIONS

Lee, C. K. 1985. Pertanika 8(2)243.*

(Continued)

*Primary Examiner* — Tamra Dicus
(74) *Attorney, Agent, or Firm* — Hoxie & Associates LLC

(57) ABSTRACT

A process for producing powdered cocoa shells as a food ingredient, as replacer for cocoa powder, to impart coloration in food products, and as fat bloom inhibitor in cocoa-based products.

13 Claims, 1 Drawing Sheet

(56) References Cited

FOREIGN PATENT DOCUMENTS

| | | | |
|---|---|---|---|
| GB | 1 195 634 A | | 6/1970 |
| GB | 1357297 | * | 6/1974 |
| GB | 2 452 972 | | 3/2009 |
| JP | 55064781 A | | 5/1980 |
| JP | 2138937 A | | 5/1990 |
| JP | 2003000210 A | * | 1/2003 |
| JP | 2006271328 A | | 10/2006 |
| WO | WO 2008/154452 A1 | | 12/2008 |
| WO | WO 2011/015425 A1 | | 2/2011 |

OTHER PUBLICATIONS http://www.topsinc.us/Portals/0/Product%20Charts/Bulk_Material_Density_Chart_REVISED.pdf, Bulk Material Density Chart, by T.O.P.S. INC., pp. 1-4, 2015.*
Matissek, R. et al., "Toxikologisch Relevante Elemente in Kakao—Vorkommen und Risikobewertung", Projekt Nr. 55. Stiftung der Deutschen Schokoladen-und Kakaowirtschaft, (2008).
Talbot, G., (1995), Chocolate Fat Bloom: The Cause and The Cure, International Food Ingredients (Jan./Feb.) pp. 40-45, (IFI's ISSN=0924-5863, Publisher: CMP Information Ltd.).
English Translation of Description (machine translation) of EP 0 068 229 from European Register website accessed on Mar. 3, 2014, http://translationportal.epo.org/emtp/translate/?ACTION= description-retrieval&COUNTRY=EP&ENGINE=google&FORMAT= docdb&KIND=Al&LOCALE=en_EP&NUMBER=0068229 &OPS= ops.epo.org&SRCLANG=de&TRGLANG=en.
English Translation of Abstract of EP0784081A1 from European Register website accessed on Mar. 7, 2014, worldwide.espacenet.com/publicationDetails/biblio?DB=worldwide.espacenet.com&II=0&ND=3&adjacent=true&locale=en_EP&FT=D&date=19970716&CC=EP&NR=0784081A1&KC=A1.
English Abstract of ES2099676A1 from European Register website accessed on Mar. 7, 2014, http://worldwide.espacenet.com/publicationDetails/biblio?DB=worldwide.espacenet.com&II=0&ND=3&adjacent=true&locale=en_EP&FT=D&date=19970516&CC=ES&NR=2099676A1&KC=A1.
English Abstract of JP2006271328A from European Register website accessed on Mar. 7, 2014, http://worldwide.espacenet.com/publicationDetails/biblio?DB=worldwide.espacenet.com&II=0&ND=3&adjacent=true&locale=en_EP&FT=D&date=20061012&CC=JP&NR=2006271328A&KC=A.
Amezqueta, S. et al., Alimentacion Equipos y Tecnologia, 240, pp. 38-42, (2009).
Dyer, B., 57$^{th}$ PCMA Production Conference (2003), pp. 130-131.
Fincke, H., "Handbuch der Kakaoerzeugnisse", 2. Auflage, (1965).
Fischer, J., "Cocoa-Processing—Cleaning Through Roasting",The Manufacturing Confectioner, (Sep. 2009), p. 89-93.
Greenwood-Barton, L.H. et al., "Utilization of Cocoa By-Products", Food Manufacture, pp. 52-56, (May 1965).
Meunier, N. et al. "Cocoa Shells for Heavy Metal Removal from Acidic Solutions" Bioresource Technology, vol. 90, pp. 255-263, (2003).
Unknown, "10 Jahre Katrin Janßen in LCI: Kakaoschalen forschung und Qualitatsmanagement"; Susswaren; pp. 11-12, (2009).
SAAG SA website http://www.saag-ge.ch/ (accessed Mar. 6, 2014).
AG Choice Organics Recycling website http://www.ag-choice.com (accessed Mar. 6, 2014).
Black Mountain Chocolate http://www.blackmountainchocolate.com (accessed Mar. 6, 2014).
Buhler website http://buhlergroup.com/northamerica/en/home.htm (accessed Mar. 6, 2014).

* cited by examiner

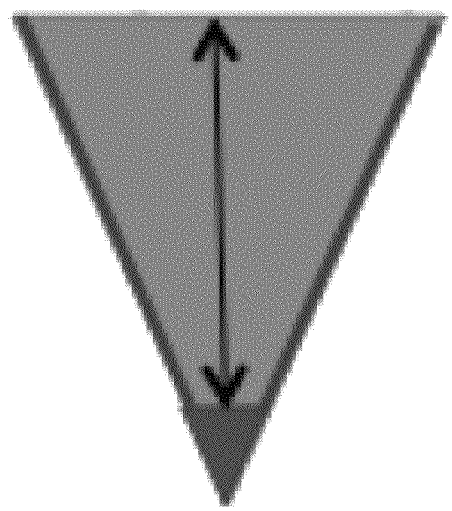

PROCESS OF PRODUCING COCOA SHELL POWDER

CROSS-REFERENCE TO RELATED APPLICATIONS

This application is a continuation-in-part of PCT/CH2012/000277, filed Dec. 20, 2012, which claims the benefit of GB1122368.2, filed Dec. 23, 2011, and GB1205847.5, filed Mar. 30, 2012 the contents of each of which are herein incorporated by reference in their entireties.

FIELD OF THE INVENTION

This invention relates to a process for producing cocoa shell powder, in particular to cocoa shell powder depleted in heavy metals, to the use of cocoa shell powder processed thereby as a food ingredient or as replacer for cocoa powder in chocolate, fillings, beverages, compounds, vending mixes or as such, to the use of this cocoa shell powder to impart colouration in food products, to the use of this cocoa shell powder in order to make chocolate products more resistant against fat bloom, and to food products containing cocoa shell powder as described above.

BACKGROUND OF THE INVENTION

Cocoa beans in their shells are conventionally processed at elevated temperatures until the shell detaches from the nibs. The shells are then cracked and separated from the nibs which are further processed in various ways to produce cocoa powder and chocolate products (see Fincke, H. "Handbuch der Kakaoerzeugnisse", 2. Auflage 1965). The shells are considered as waste by-products for which several applications have been found.

US2011/0151098 provides a food comprising at least 30 mass % alkalized cocoa shells in the food and a method for manufacturing the corresponding food. However, this method does not comprise any washing steps or any removal of heavy metals.

EP2174555 discloses an acidified dairy food comprising cocoa shells, a method for its production, and the use of cocoa shells to increase the fibre content and/or the lower fat content of an acidified dairy product.

In United Kingdom patent application 2452972 a chocolate is described which incorporates cocoa beans with or without their shells.

EP1728434 discloses a process for extracting cocoa shells in order to produce fractions enriched in theobromine or in polyphenols.

European patent 1733624 relates to a process for milling cocoa shells without moving mechanical parts and to the granular edible products thereof. However, this invention as claimed performs a mere dry processing of cocoa shells and does not refer to any washing procedure or measures which are targeted on reducing the heavy metal concentration in cocoa shells.

Spanish patent ES 2099676 discloses a cocoa fibre product based on roasted cocoa husks and its application as a dietetic product in the pharmaceutical and food industry. However, no process parameters such as washing steps are mentioned.

GB patent 1195634 claims a flavouring and colouring extract from cocoa shells for use in confectionery and ice cream products.

In U.S. Pat. No. 4,156,030 there is a process described for preparing a berry-like flavourant and colorant by extracting cocoa shells with an acidified ethanol solution and by separating the resulting extract from the cocoa shell residue.

Furthermore, cocoa shells can be used inter alia for manufacturing paper (see http://www.blackmountainchocolate.com), for mulching (see www.ag-choice.com), for the manufacture of plastic products (see EP0784081A1) or of meat food packaging (see JP55064781A), as substitute for cork in linoleum (see Greenwood-Barton, L. H. *Food Manufacture* 1965; May: 52-56) or for cosmetics (see http://www.saage.ch).

In the field of engineering sciences, several publications describe the use of cocoa shells as biofiltration support and for the removal of metals from contaminated soil and industrial effluents (see Meunier, N. et al. *Bioresource Technology* 2003; 90: 255-263).

For several decades it has been known that cocoa shells may contain undesirable components such as mycotoxins, heavy metals or pesticides which often pose a risk to human health (see "10 Jahre Katrin Janßen im LCI: Kakaoschalenforschung und Qualitätsmanagement". *Süsswaren* 2009; 11-12). The majority of ochratoxin A in cocoa beans, e.g., is present in the cocoa shells and 98% of initial ochratoxin A contamination from cocoa beans can be removed by applying bicarbonate washing (see Amezqueta, S. et al. *Alimentacion Equipos y Tecnologia* 2009; 240: 38-42). Furthermore, due to their strong ion exchange properties cocoa shells significantly accumulate toxicologically relevant metal species such as aluminium (Al), lead (Pb), cadmium (Cd), chromium (Cr), cobalt (Co), iron (Fe) and nickel (Ni). Especially cocoa shells processed from cocoa beans of South American or Caribbean origin are remarkably contaminated by cadmium (see Matissek, R. und M. Raters. "Toxikologisch relevante Elemente in Kakao—Vorkommen und Risikobewertung". Projekt Nr. 55. Stiftung der Deutschen Schokoladen-und Kakaowirtschaft. 2008).

Differently coloured cocoa-based food products may be prepared by alkalizing cocoa nibs, cocoa liquor or cocoa cake and cocoa powder, respectively. Whereas liquor alkalization potentially leads to degradation of cocoa butter and results in a narrow range of colour and flavour profiles, the alkalization of cocoa cake or cocoa powder may be accompanied by protein and starch degradation providing unfavourable effects on texture and taste of dairy food and confectionery. Although nib alkalization is regarded as best option for colour and flavour development in cocoa-based products, this process is more complex and cost-intensive due to the high commodity value of cocoa butter (see Dyer, B. 57th *PCMA Production Conference* 2003; 130-131; see Fischer, J. *The Manufacturing Confectioner* 2009; September: 89).

Alternatively, alkalized cocoa shell powder may be used to impart colouration in food products. Since cocoa shells on average contain only about 4 weight % of fatty components, the disadvantages associated with decomposition of cocoa butter can be avoided. EP2174557 discloses a food comprising at least 30 mass % alkalized cocoa shells as the only source of chocolate flavour in food products. However, this patent application is silent on processing of cocoa shells comprising the steps of sieving, grinding, washing, alkalizing and heavy metal removal.

Fat bloom in chocolate products is a major problem in the chocolate industry. "Bloom" in this context means a separation of fat crystals from the matrix of the chocolate, generally caused by separation of cocoa butter from the matrix and extrusion or recrystallization of fat to or on the surface with the result being white layering or splotches on the surface of the chocolate. Bloom is usually ascribed to partial liquification, e.g. due to temperature fluctuations, and then recrystallization of the fat which sometimes migrates to the surface. The bloom appears as a white, waxy substance on the surface of the chocolate and is objectionable to consumers.

Document JP2006271328A discloses an oil and fat composition containing a fat bloom preventing agent to be used for chocolate manufacture. The fat bloom preventing agent is selected from the group consisting of glycerol organic acid fatty acid ester, polyglyceryl saturated fatty acid ester, and sorbitan saturated fatty acid ester.

Japanese patent 2138937 claims a composition which can prevent fat bloom by using more than 20 weight % of a specific monounsaturated and disaturated triglyceride in which more than 75 weight % of the saturated groups is the residue of stearic acid.

U.S. Pat. No. 5,849,353 provides a process for preventing fat bloom in a chocolate-like product containing non-tempering cocoa butter substitute.

Chocolate fat bloom caused by a Form V to a Form VI transformation, whether or not this is also linked to fat migration, can be inhibited by the use of fats called "Prestine" with a very specific triglyceride composition (see Talbot, G. *IFI* 1995; 1: 40-45).

SUMMARY OF THE INVENTION

The present applicants have sought to find an economically improved method for processing cocoa shells and to use these processed cocoa shells as fat bloom inhibitor, as a food ingredient in dairy products, as volume replacer for cocoa powder in chocolate, filings, beverages compounds, vending mixes or as such and to impart colouration in food products.

BRIEF DESCRIPTION OF THE FIGURES

FIG. 1. Depicts a cone biscuit as described in Example 5.

DESCRIPTION OF THE INVENTION

In one aspect, therefore, this invention provides a process for producing cocoa shell powder from preroasted cocoa beans. The cocoa beans may be of African, Asian, Central American or South American origin and may be unfermented, fermented or well-fermented. The first process steps comprising preroasting, cracking, removing and separating the cocoa shells from the nibs as well as selecting and separating a fraction of cocoa shells, e.g. by sieving, may be done by standard processes, as described inter alia in Fincke, H., "Handbuch der Kakaoerzeugnisse", 2. Auflage 1965. Alternatively, the G. W. Barth NARS (Nibs, Alkalization and Roasting System) process may be applied, characterized by a careful treatment of the raw beans. Exposure of cleaned beans to infrared radiation enables optimal shell detachment (http://www.buhlergroup.com).

Suitable fractions of cocoa shells resulting from a winnowing process (Z10 (>2.8 mm) up to Z1 (>7 mm)) may be selected according to their mean particle size of more than 1 mm, e.g. of 2.8 mm. Fractions characterized by a mean particle size of less than 1 mm contain higher amounts of contaminants such as dust and sand and may be discarded.

A grinding step enhancing the washing efficiency may be inserted between selecting and washing of cocoa shells. This procedure performed by a centrifugal breaker system increases the density of cocoa shells from about 175 g/L for particles larger than 2.8 mm to about 275 g/L for particles of a mean size of 3.8 mm, whose diameter does not exceed 5 mm.

In order to remove sand, off-flavour notes and undesired components such as mycotoxins or pesticides, the selected fractions may be washed by aqueous buffer solutions based on weak inorganic or organic acids and their conjugated bases or on weak inorganic or organic bases and their conjugated acids, adjusted to a pH value between 2.0 and 9.0, e.g. 4.0 to 7.0, e.g. about 7.0. The washing temperature applied may be between 15° C. and 100° C., e.g. 80° C. Selected fractions of cocoa shells may be submerged in the buffer solution, whose weight exceeds the weight of the cocoa shells by a factor of 0.5 to 30, and may be agitated for a period of time between 1 min and 12 h. This washing step may be repeated up to five times. After the buffer solution has finally been drained, the wet cocoa shells may be dried by heat convection, heat conduction, steam and vacuum or counter current heated air, applied for up to 24 h at a temperature higher than 50° C. to a moisture content less than 10 weight %, e.g. less than 5 weight %.

After the washing step using aqueous buffer solutions or alternatively after the final drying and grinding steps, the selected fractions of cocoa shells may be alkalized by standard processes, e.g. as described in Fincke, H., "Handbuch der Kakaoerzeugnisse", 2. Auflage 1965. By means of alkalization of cocoa nibs and depending on the process parameters and the alkaline components used, colours may be achieved ranging from brown over red to black cocoa powder. Process conditions for manufacturing black cocoa powder as reference have been developed and a colour specification is set for external colour values, as given in Table 2. Alkalization of cocoa shells may be performed by suspending washed cocoa shells in 9 to 14 weight % water, by adding 1.5 to 7 weight % of an aqueous solution (concentration: 100% w/w) of an alkali metal carbonate such as potassium carbonate, and by adding 15 to 25 weight % of an aqueous solution (concentration: 25% w/w) of an alkali metal hydroxide such as sodium hydroxide. Either or both alkaline solution may be applied. Optionally, 0.008 to 0.009 weight % of an iron component such as iron(III)sulfate, iron(III)chloride, iron(III)citrate, iron(III)glycerol-phosphate or iron saccharate may be added to the alkalization batch. All details on weight percentage given above refer to the initial weight of washed and dried cocoa shells. The alkalization procedure may be performed at a temperature between 80 and 130° C., e.g. 95° C. or 125° C., for a period of time of 20 to 85 min, e.g. 60 min, and at a pressure between 2 and 8 bar, e.g. 5 bar. Finally, the alkalized cocoa shell powder may be cooled to a temperature of about 60 to 70° C., e.g. 65° C., in 7 to 12 min and dried for a period of time of 35 to 85 min before being ground to a mean particle size of less than 75 μm.

In order to reduce the concentration of metal contaminants in cocoa shells as described above, the washed cocoa shell may be treated with a chelating agent which comprises an organic acid or any alkali metal salt or alkali earth metal salt thereof as chelating agents. This organic acid may contain at least two carboxylic groups, e.g. tartaric acid, preferably three carboxylic groups, e.g. citric acid. The chelating agent may be applied in aqueous solution at a concentration of 1 mM to 5 M, e.g. about 100 mM, and at a pH value between 2.0 and 9.0, e.g. at 7.0. Furthermore, also pectines may be used as chelating agent for cadmium or other heavy metals.

The cocoa shells depleted in metal species as listed above may be dried at a temperature of 20 to 140° C. at atmospheric pressure, e.g. at 80 to 130° C., for a period of time of 1 min to 24 h, to a final moisture content of <10 weight %, e.g. 1, 2, 3 or 5 weight %. Alternatively, reduced pressure or vacuum-drying at a temperature between 20 and 50° C., e.g. around 40° C., may be applied to the cocoa shells depleted in metal species, in order to achieve a final moisture content of <10 weight %, e.g. 1, 2, 3 or 5 weight %.

Subsequently, the dried cocoa shells may be ground to a final mean particle size of less than 75 μm, which condition has to be fulfilled by ≥99.5% of the particles according to measurements performed by a water sieving method. The maximum particle size may be adjusted, e.g. from 60 to 200 μm. Grinding may be done by an impact classifier mill. The feed material is conveyed through a pneumatic feed duct into the grinding zone. The main airflow enters the mill through the main air inlet underneath a grinding disc which rotates with tip speeds of 70 to 120 m/s. Grinding fineness is adjusted by the speed of the classifier wheel. A product of the desired particle size is drawn through the classifier, whereas coarse material will be rejected for further size reduction. Resulting fines will be separated from the airflow in a cyclone filter unit downstream to the mill.

In another aspect, this invention covers food products containing dried and ground cocoa shells processed as described above. This cocoa shell powder may be used as a low-germ food ingredient in dairy products or for making cocoa-based products such as chocolate or chocolate compositions, and for the manufacture of food products such as fillings, compounds and beverages containing up to 70 weight %, e.g. 5 to 40 weight %, preferably 20 to 30 weight % of the processed cocoa shell powder as replacer for non-fat cocoa solids. For example, cocoa powder or cocoa solids in confectionery such as chocolate or in food products containing chocolate compositions as bulk ingredient may be substituted by the processed cocoa shell powder partly or completely. Possible applications may include chocolate fillings, cocoa beverages, ice cream, mousse, pralines, tablets, vending mixes, enrobing of biscuits or savory crackers. Cocoa shells processed as described above may not only be used as replacer for non-fat cocoa solids such as e.g. whipping agents in mousses or mouthfeel enhancers in vending mixes, but may also impart functional benefits by increasing viscosity, e.g. in ice cream, frozen food or confectionery. Furthermore, dried and ground cocoa shells processed as described above may be used to impart colouration in food products, including but not limited to cocoa-based products.

Characteristics and features of cocoa shell powder as disclosed:

Taste and Flavour

Procedure: analyzed by taste panel

Result: light cocoa with slight hints of cinnamon and nuts; taste neutral and free from off-flavours (smoky, burnt, hammy, mouldy, musty)

Colour

Procedure: Measurements of external colour took place with the aid of spectrophotometer Minolta CM-3500d. The spectral reflectance of the object was determined for the whole visible range of the spectrum. The corresponding values $L^*$, $a^*$ and $b^*$ were calculated from the spectral reflectance data. In order to analyze the external colour of cocoa shell powder, a 30 mm target mask was used. The liquefied and homogenized cocoa shell sample was filled into a petridish, until the layer reached a thickness of at least 3 mm. After removing air bubbles, the petridish was heated in an oven until the sample temperature was 40° C.±2° C. For colorimetric measurements on alkalized cocoa shell powder, a white matrix compound comprising 49.80 weight % sucrose, 22.70 weight % whey powder, 26.90 weight % hydrogenated palm kernel stearin, 0.59 weight % soya lecithin and 0.01 weight % natural vanilla flavour was used. The colour values as listed in Table 1, Table 2 and Tables 6 to 13 refer to the CIE 1976 $L^*a^*b^*$ COLOR SPACE method developed by Minolta Camera Co., Ltd. This measuring code closely represents human sensitivity to colour. Equal distances in this system approximate equally perceived colour differences, $L^*$ is the lightness variable (0→Black; +100→White), whereas $a^*$ (−60→Green; +60→Red) and $b^*$ (−60→Blue; +60→Yellow) are chromaticity coordinates.

TABLE 1

| Parameter | COCOA SHELLS ALKALISED WITH POTASSIUM CARBONATE | COCOA SHELLS NATURAL |
|---|---|---|
| L* | 11 | 16.9 |
| a* | 7.1 | 9.9 |
| b | 7.1 | 12.4 |

Table 1 demonstrates the impact of alkalization on colour variations of natural cocoa shells, covering a range of natural cocoa powder colour up to the colour of black alkalized cocoa powder.

TABLE 2

| Parameter | LOWER SPECIFICATION | UPPER SPECIFICATION |
|---|---|---|
| L* | 2.7 | 4.7 |
| a* | 1.0 | 2.0 |
| b | 0.5 | 1.5 |

Table 2 defines the lower and upper specification of L*a*b* values for reference black cocoa powder.

Microbiological Requirements

TABLE 3

| Total Plate Count | max. 5000 cfu/g | ISO 4833-2003 |
| Yeasts and moulds | both max. 50 cfu/g | ISO 7954-1987 |
| Enterobacteriaceae | less than 10 cfu/g | ISO 21528-2-2004 |
| E. coli | Absent in 1 g | ISO 7251-2005 |
| Salmonella sp. | Absent in 750 g | ISO 6579-2004 | cfu: colony-forming units
ISO: International Organisation for Standardisation

Physical Requirements

TABLE 4

| Fineness 75 micron (on total product) | Min. 99.5% | IOCCC 38-1990 |

IOCCC: International Office of Cocoa, Chocolate and Confectionery

Dependent on the degree of alkalization, the cocoa shell powder processed as claimed in this invention has bulk densities between 0.35 kg/L (natural cocoa shell powder) and 0.52 kg/L (black alkalized cocoa shell powder).

Composition Analysis

Parameters determined: JJL2G; JJL1Q; JJL3Q; JJF02; J3087; J8265; A7273; A7274; J1048; J1045; J1046; J1038; J1050

TABLE 5

TEST RESULTS
Physical-chemical Analysis

| | | |
|---|---|---|
| JJL2G | Water content (#) | |
| Method: | §64 LFGB L 06.00-3, mod., Gravimetry | |
| Water content | | 4.8 g/100 g |
| JJL1Q | Raw protein (#) | |
| Method: | §64 LFGB L 06.00-7, mod., Titrimetry (N × 6.25) | |
| Protein | | 16.1 g/100 g |
| JJL3Q | Protein corrected with theobromine & caffeine nitrogen (#) | |
| Method: | calculated | |
| Protein | | 14.7 g |
| JJF02 | Fat total (#) | |
| Method: | §64 LFGB L 06.00-6 mod., Gravimetry | |
| Fat. total | | 3.6 g/100 g |
| J3087 | Fiber (total dietary) (#) | |
| Method: | AOAC 991.43/32.1.17 (2000), gravimetric | |
| Total dietary fibre | | 54.3% |
| J8265 | Caffeine and Theobromine (#) | |
| Method: | §64 LFGB L 45.00-1, HPLC-DAD | |
| Theobromine | | 670 mg/100 g |
| Caffeine | | 74.7 mg/100 g |
| A7273 | Vitamin B1 - Thiamine base | |
| Method: | EN 14122 2001 mod., rp-HPLC-FLD | |
| Subcontracted to an Eurofins laboratory accredited for this test | | |
| Vitamin B1 (thiamin) | | 0.271 mg/100 g |
| A7274 | Vitamin B2 - riboflavin | |
| Method: | En 14152, mod., rp-HPLC-FLD | |
| Subcontracted to an Eurofins laboratory accredited for this test | | |
| Vitamin B2 (riboflavin) | | 0.130 mg/100 g |
| J1048 | Sodium (Na) | |
| Method: | DIN EN ISO 11885, mod., ICP-OES | |
| Subcontracted to an Eurofins laboratory accredited for this test | | |
| Sodium (Na) | | 54 mg/kg |
| J1045 | Potassium (K) | |
| Method: | DIN EN ISO 11885, mod., ICP-OES | |
| Subcontracted to an Eurofins laboratory accredited for this test | | |
| Potassium (K) | | 27000 mg/kg |
| J1046 | Magnesium (Mg) | |
| Method: | DIN EN ISO 11885, mod., ICP-OES | |
| Subcontracted to an Eurofins laboratory accredited for this test | | |
| Magnesium (Mg) | | 4400 mg/kg |
| J1038 | Calcium (Ca) | |
| Method: | DIN EN ISO 11885, mod., ICP-OES | |
| Subcontracted to an Eurofins laboratory accredited for this test | | |
| Calcium (Ca) | | 3000 mg/kg |
| J1050 | Phosphorus (P) | |
| Method: | DIN EN ISO 11885, mod., ICP-OES | |
| Subcontracted to an Eurofins laboratory accredited for this test | | |
| Phosphorus (P) | | 3400 mg/kg |

(#) = Eurofins Analytik GmbH, Wiertz-Eggert-Jorissen is accredited for this test
LFGB: Lebensmittel-und Futtermittelgesetzbuch (DE)
AOAC: Association of Analytical Communities
EN: Europäische Normen
DIN: Deutsches Institut für Normung Fat bloom is measured by visual evaluation on a scale between 0 and 5, in which 0 represents a perfect surface and 5 standing for an unpleasant cocoa product covered with white or grey layering on the surface. Replacing cocoa powder, i.e. non-fat cocoa solids, partly or completely by the processed cocoa shell powder significantly improves the final product's resistance to fat bloom. For example, a biscuit enrobed with a chocolate product containing the processed cocoa shell powder as fat bloom inhibitor shows a resistance to fat bloom increased by 10% as compared to biscuits enrobed with standard chocolate products. Without wishing to be bound to a specific mechanistic theory, the inventors consider a possible mechanism to lie in a reduced concentration of cocoa butter in cocoa shells, which itself leads to a reduced separation of cocoa butter from the matrix of cocoa products.

Based on process steps comprising an optional microbial decontamination of sieved cocoa shell particles, followed by washing and treating with a chelating agent thereof, the invention as claimed provides a cocoa shell powder characterized by a significant low microbial burden (see Table 3). Furthermore, this cocoa shell powder processed as claimed in this invention finally contains less than 5 ppb of ochratoxin A, less than 4 ppb of aflatoxins and less than 1 ppm of arsenic, cadmium or lead. Pesticides detectable are below Maximum Residue Levels (MRL) according to Regulation (EC) No 396/2005.

As regards hitherto known products, Moner Llacuna S.A. offers cocoa fibers under the product name "Ficao". Healy Group provides cocoa fibers from selected parts of cocoa husks.

The products of this invention demonstrate several advantages over hitherto known food products containing cocoa shells. Thus, the cocoa shell powder of this invention:
- can be economically produced on an industrial scale;
- under toxicological aspects provides a safe replacer for cocoa powder;
- provides health benefits to cocoa-based products due to:
    - a reduced fat content of an average 2 to 6 weight %,
    - a reduced theobromine and caffeine content,
    - an increased dietary fiber content of about 54 weight %,
    - an increased dietary fiber content of about 60 weight %,
    - an increased flavanol content,
    - being enriched in potassium (K) (about 2.7 weight %), which in connection with a low sodium (Na) content (about 0.005 weight %) considerably lowers blood pressure;
- can be used to impart colouration in food products;
- significantly increases the resistance of chocolate products to fat bloom;
- can be used to increase the resistance to fat bloom in compounds which comprise the cocoa shell powder of the present invention;
- improves rheological properties, e.g. by imparting an increase in viscosity yield value for frozen confectionery coatings;
- exhibits a high water-absorption capacity; and
- provides a broad range of applicability;
- can be used for improved "structure-building", e.g. mousse, compared to compositions without the cocoa shell powder of the invention described herein;
- can used as part of caseinate-free vending mixes which comprise the cocoa shell powder of the invention described herein, wherein said mixes provide improved mouthfeel compared to mixes which do not comprise the cocoa shell powder of the present invention;
- can be used in compositions for improving barrier function, e.g. cone-spraying, wherein said compositions comprise the cocoa shell powder and wherein the compositions have improved barrier function compared to compositions that do not comprise the cocoa shell powder of the present invention;
- can be used in paper, packaging material, and poster products which comprise the cocoa shell powder of the present invention.

Following is a description by way of example only of processes and products of this invention.

Example 1

Processing of Cocoa Shell Powder, Including Washing and Heavy Metal Removal

Step 1: Crack preroasted cocoa beans
Step 2: Remove and separate cocoa shells from nibs
Step 3: Select the fraction of correct particle size (>1 mm) by sieving
Step 4: Grind the selected and decontaminated fraction by a centrifugal breaker
Step 5: Wash the ground fraction by an aqueous bicarbonate buffer
Step 6: Alkalize the washed fraction by an aqueous solution of potassium carbonate and sodium hydroxide
Step 7: Add an aqueous solution of citric acid as chelating agent
Step 8: Dry the cocoa shells depleted in heavy metals at 100° C. under atmospheric pressure
Step 9: Grind the dried cocoa shells by an impact classifier mill Alternatively, alkalization may also follow step 9, which comprises the grinding of dried cocoa shells.

Example 2

Manufacturing of Black Cocoa Shell Powder Using an Iron Component

The reference alkalization procedure to produce black cocoa powder was applied to processed cocoa shells (see Example 1) in order to achieve a similar blackness in cocoa shell powder as in reference black cocoa powder (see Table 2).

An amount of 7.5 kg of processed cocoa shells was heated to 95° C. and 1.04 kg water were added. When the mixer jacket temperature reached 125° C., 0.1225 kg potassium carbonate in 0.1225 kg water as well as 0.066 kg iron(III) sulfate and 0.35 kg sodium hydroxide in 1.05 kg water were added. After a reaction time of 60 min, pressure was released and the alkalized cocoa shells were dried and ground before colour analysis.

Results:

1. Colorimetric Measurements on Pure Alkalized Cocoa Shell Powder

TABLE 6

| Parameter | REFERENCE BLACK COCOA POWDER | BLACK COCOA SHELL POWDER |
| --- | --- | --- |
| L* | 2.7-4.7 | 4.5 |
| a* | 1.0-2.0 | 0.7 |
| b | 0.5-1.5 | 1.0 |

Basically, the L*a*b* values for black cocoa shell powder are within the colour specification as set for reference black cocoa powder. The slight deviations as regards the a* parameter are not visually distinguishable. Therefore, black cocoa shell powder prepared in an alkalizing medium containing an iron component may be used as replacer for black cocoa powder.

2. Colorimetric Measurements on Alkalized Cocoa Shell Powder Blended in a Matrix

TABLE 7

| Parameter | REFERENCE BLACK COCOA POWDER IN MATRIX (5 wt. %) | BLACK COCOA SHELL POWDER IN MATRIX (5 wt. %) | Difference |
| --- | --- | --- | --- |
| L* | 24.8 | 23.6 | −1.2 |
| a* | 6.4 | 4.2 | −2.2 |
| b | 7.7 | 5.5 | −2.2 |

TABLE 8

| Parameter | REFERENCE BLACK COCOA POWDER IN MATRIX (10 wt. %) | BLACK COCOA SHELL POWDER IN MATRIX (10 wt. %) | Difference |
| --- | --- | --- | --- |
| L* | 16.1 | 14.8 | −1.3 |
| a* | 6.0 | 3.5 | −2.5 |
| b | 6.5 | 4.1 | −2.4 |

TABLE 9

| Parameter | REFERENCE BLACK COCOA POWDER IN MATRIX (15 wt. %) | BLACK COCOA SHELL POWDER IN MATRIX (15 wt. %) | Difference |
| --- | --- | --- | --- |
| L* | 15.3 | 11.8 | −3.5 |
| a* | 4.2 | 2.9 | −1.3 |
| b | 5.0 | 3.1 | −1.9 |

For evaluation of internal colour, reference black cocoa powder and black cocoa shell powder each were blended in a white matrix (see details on colour analysis) for final concentrations of 5, 10 and 15 weight %, respectively. Doubling of the inclusion percentage of black cocoa shell powder from 5 to 10 weight % resulted in 8.8 points lower L* values, i.e. more blackness, and trebling of the inclusion percentage of black cocoa shell powder from 5 to 15 weight % resulted in 11.8 points more blackness. Comparatively, doubled and trebled inclusion percentages for reference black cocoa powder led to a decrease of L* values by 8.7 and 9.5 points, respectively. Therefore, black cocoa shell powder imparts a dark colouration in food products more effectively than reference black cocoa powder does.

Example 3

Manufacturing of Black Cocoa Shell Powder Without an Iron Component

The reference alkalization procedure to produce black cocoa powder was applied to processed cocoa shells (see Example 1) in order to achieve a similar blackness in cocoa shell powder as in reference black cocoa powder (see Table 2).

An amount of 7.5 kg of processed cocoa shells was heated to 95° C. and 1.04 kg water were added. When the mixer jacket temperature reached 125° C., 0.1225 kg potassium carbonate in 0.1225 kg water as well as 0.35 kg sodium hydroxide in 1.05 kg water were added. After a reaction time of 60 min, pressure was released and the alkalized cocoa shells were dried and ground before colour analysis.

Results:

1. Colorimetric Measurements on Pure Alkalized Cocoa Shell Powder

TABLE 10

| Parameter | REFERENCE BLACK COCOA POWDER | BLACK COCOA SHELL POWDER |
| --- | --- | --- |
| L* | 2.7-4.7 | 5.7 |
| a* | 1.0-2.0 | 2.5 |
| b | 0.5-1.5 | 1.6 |

The L*a*b* values for black cocoa shell powder are not within the colour specification as set for reference black cocoa powder. However, these deviations are not visually distinguishable. Therefore, black cocoa shell powder prepared in an alkalizing medium without an iron component may be used as replacer for black cocoa powder.

2. Colorimetric Measurements on Alkalized Cocoa Shell Powder Blended in a Matrix

TABLE 11

| Parameter | REFERENCE BLACK COCOA POWDER IN MATRIX (5 wt. %) | BLACK COCOA SHELL POWDER IN MATRIX (5 wt. %) | Difference |
| --- | --- | --- | --- |
| L* | 24.8 | 26.1 | 1.3 |
| a* | 6.4 | 6.8 | 0.4 |
| b | 7.7 | 8.2 | 0.5 |

TABLE 12

| Parameter | REFERENCE BLACK COCOA POWDER IN MATRIX (10 wt. %) | BLACK COCOA SHELL POWDER IN MATRIX (10 wt. %) | Difference |
| --- | --- | --- | --- |
| L* | 16.1 | 17.4 | 1.3 |
| a* | 6.0 | 6.0 | 0.0 |
| b | 6.5 | 6.4 | −0.1 |

TABLE 13

| Parameter | REFERENCE BLACK COCOA POWDER IN MATRIX (15 wt. %) | BLACK COCOA SHELL POWDER IN MATRIX (15 wt. %) | Difference |
| --- | --- | --- | --- |
| L* | 15.3 | 15.1 | −0.2 |
| a* | 4.2 | 4.9 | 0.7 |
| b | 5.0 | 5.3 | 0.3 |

For evaluation of internal colour, reference black cocoa powder and black cocoa shell powder each were blended in a white matrix (see details on colour analysis) for final concentrations of 5, 10 and 15 weight %, respectively. Doubling of the inclusion percentage of black cocoa shell powder from 5 to 10 weight % resulted in 8.7 points lower L* values, i.e. more blackness, and trebling of the inclusion percentage of black cocoa shell powder from 5 to 15 weight % resulted in 11.0 points more blackness. Comparatively, doubled and trebled inclusion percentages for reference black cocoa powder led to a decrease of L* values by 8.7 and 9.5 points, respectively. Therefore, black cocoa shell powder imparts a dark colouration in food products more effectively than reference black cocoa powder does.

Example 4

Increased Resistance of Chocolate Products Containing Cocoa Shell Powder to Fat Bloom Evaluation of trials: every 14 days Total evaluation time: 1 year Scorings: 0=high gloss 1=loss of gloss 3=fat bubbles visible 5=sample completely grey

TABLE 14

Fatbloom Evaluation

| Scoring: | 0 days | +14 days | +1 month | +1½ month | +2 months |
|---|---|---|---|---|---|
| Sample 1 | 0 | 0 | 1 | 1 | 3 |
| Sample 2 | 0 | 0 | 0 | 0 | 0 |

Sample 1:
chocolate products based on cocoa powder
Sample 2:
chocolate products, wherein all cocoa powder has been replaced by cocoa shell powder Example 5

Use of Cocoa Shells in Cone Spraying Compound for Improved Barrier Function, Rheology and Shelf Life Description Compound coatings used for spraying ice cream cones have a fine texture and unique fat composition which are required for homogeneous spraying. In this context the rheology of the compound plays an important role in order to obtain a layer of compound in the cone which is as thin as possible. Another typical technical challenge is that the compound has to guarantee a good humidity barrier in order to keep the cone crunchy and ensure the quality of the product until the end of the shelf life. The shelf life of these ice creams is generally 12 months. Milk and dark compound coatings generally contain between 7.5 and 17.5% of cocoa powder to deliver the chocolate-like taste.

Purpose

The purpose of the trial is to evaluate the effect of 100% replacement of cocoa powder by fine cocoa shell powder in a compound coating on:
  Rheology and quantity of compound in end application
  Humidity barrier function in end application
  Shelf life of end application
  Material and Methods The reference compound coating (REF) is a dark compound which contains 9% cocoa powder in the recipe. The test compound coating (TEST) has the same composition as REF except for the cocoa powder which is replaced 100% by fine cocoa shell powder. As such TEST contains 9% of fine cocoa shell powder.

Rheology

The rheology of the compound coating is measured with a rheometer. Measurement occurs at 40+/−0.1° C. in the test product. Viscosity is expressed in mPa·s and yield value in Pa. Rheology is determined on both compound coatings REF and TEST.

Humidity Barrier Function

The water-test procedure gives an indication of water absorption of the biscuit after spraying with the compound coating and gives an indication on how well the spraying can act as barrier.

3 cones are taken per reference and weighed. Water (3° C.) is poured in the cones up to 1 cm from the top of the cone. Let rest for 20'.

Then the weight of the cones after emptying is measured and the cones are left upside down for 1'.

Shelf Life

For the shelf life test, first all coated cones are filled with ice cream and frozen for 1 hour. Then 2 sets of cones are made with each set consisting of an equal number of cones REF and TEST.

An accelerated conservation test is performed in which 5 cones REF and 5 cones TEST are put in the refrigerator at 5° C. for evaluation of shelf life. Evaluation of shelf life is done by a taste panel and is based on scoring crunchiness by a taste panel during 5 subsequent days.

A scoring system is used with:
  0=crunchy
  1=not crunchy
  2=chewy (11 cones REF and 11 cones TEST remain in the freezer for 1 year with monthly evaluation of crunchiness for shelf life evaluation. (these results will be available only in January 2014; for the first 3 months the score is 0 for both REF and TEST)

Results

Impact on Rheology

|  | Specification | REF | TEST |
|---|---|---|---|
| Linear viscosity (mPa·s) | 150-350 | 202 | 218 |
| Casson viscosity (mPa·s) |  | 144 | 163 |
| Yield value (mPa) | <3 | 0.9 | 1.1 |

The use of fine cocoa shell powder results in a 8% and 13% increase in linear and Casson viscosity, respectively. This indicates that the fluidity of the compound is slightly decreased and the internal restriction is increased. The yield value is increased with 22% (from 0.9 to 1.1 mPa) which may result in a more homogeneous spray coating.

Quantity of Compound in the Cone

Before and after spraying, the cones are weighed.

|  | REF | TEST |
|---|---|---|
| Weight cone before spraying(g) | 16.060 | 16.440 |
| Weight of cone after spraying (g) | 24.256 | 24.315 |
| Weight of compound (g) | 8.196 | 7.875 |

With the same settings for the spraying installation, there is 4% less compound on weight basis in the cone with TEST compared to REF.

Distance is defined as the length between the top of the cone biscuit and the horizontal layer where the compound triangle at the bottom (in the tip) begins (See, FIG. 1)

|  | REF | TEST |
|---|---|---|
| Distance (mm) | 61.3 +/− 1.96 | 63.8 +/− 1.96 |

The tip at the bottom of the ice cream cone with TEST compound is 4% less high compared with the tip in the cone after spraying with the REF compound.

This result is in line with the lower total weight of compound with TEST compared with REF. These results can be explained by the change in rheology (in particular of the yield value) when fine cocoa shell powder is used in compound TEST.

Shelf Life (Accelerated Model)

|      | T + 1 | T + 2 | T + 3 | T + 4 |
|------|-------|-------|-------|-------|
| REF  | 1     | 1     | 2     | 2     |
| TEST | 0     | 0     | 0     | 2     |

The evaluation of shelf life is done by a taste panel (n=4) and is based on crunchiness scoring over 5 subsequent days (0=crunchy, 1=not crunchy, 2=chewy). The ice cream cones which are kept in the refrigerator at 5° C. and are made with the fine cocoa shell powder in the coating (TEST) remain crunchy until day 3, while for the REF, the product loses its crunchiness already from day 1 and is chewy as from day 3.

Barrier Function

| WATER                 | REF  | TEST |
|-----------------------|------|------|
| Depth of the bottom/17| 65.3 | 65   |
| cone 1 with chocolate | 24.2 | 24.2 |
| cone 1 after water    | 25.3 | 24.4 |
| weight of water       | 1.1  | 0.2  |
| Depth of the bottom/18| 61.7 | 62.5 |
| cone 2 with chocolate | 24.9 | 23.8 |
| cone 2 after water    | 26.1 | 24   |
| weight of water       | 1.2  | 0.2  |
| Depth of the bottom/19| 62.5 | 65   |
| cone 3 with chocolate | 24.7 | 23.8 |
| cone 3 after water    | 25.4 | 24   |
| weight of water       | 0.7  | 0.2  |

The average water absorption is 1.0 in REF and 0.2 in TEST. The water absorption is less when fine cocoa bran powder is used in comparison with cocoa powder.

The invention claimed is:

1. A process for producing cocoa shell powder, which comprises the steps of:
   (a) selecting and separating cocoa shells from nibs;
   (b) washing the cocoa shells of (a);
   (c) adding a chelating agent to (b); and
   (d) drying the cocoa shells of (c);
   wherein the chelating agent is dissolved in water and comprises an organic acid containing two or three carboxylic groups or any alkali metal salt or alkali earth metal salt thereof;
   wherein the organic acid is tartaric acid or citric acid.

2. The process as claimed in claim 1, which further comprises an alkalization step.

3. The process as claimed in claim 2, wherein alkalization is performed by suspending washed cocoa shells in water and by adding an alkalizing medium.

4. The process as claimed in claim 3, wherein the alkalizing medium includes an iron component and comprises an aqueous solution of an alkali metal carbonate or an aqueous solution of an alkali metal hydroxide or a mixture of alkaline solutions.

5. The process as claimed in claim 3, wherein the washed cocoa shells are alkalized for a period of time between 20 min and 85 min, at a temperature between 80° C. and 130° C., at a pressure between 2 bar and 8 bar, and wherein the alkalized cocoa shells are cooled to 60 to 70° C. in 7 to 12 min and dried for 35 to 85 min.

6. The process of claim 3, wherein the alkalization occurs after washing the cocoa shell and prior to addition of the chelating agent.

7. The process of claim 1, wherein the selected cocoa shell fraction is characterized by a mean particle size of more than 1 mm.

8. The process of claim 1, wherein washing is performed by aqueous buffer solutions for a period of time between 1 min and 12 h at a pH value between 2.0 and 9.0 and at a temperature between 15° C. and 100° C.

9. The process of claim 1, wherein the cocoa shell fraction is dried for a period of up to 24 h at a temperature above 50° C. at atmospheric pressure or at a temperature below 50° C. under reduced pressure to a moisture content of less than 10 weight %.

10. The process of claim 1, wherein the cocoa shells are ground to a mean particle size of less than 75 μm.

11. A method of imparting colouration in a food product, wherein the method comprises adding the cocoa shell powder produced according to the process of claim 1 during the manufacture of the food product in order to impart brown or black colouration.

12. A method of increasing resistance against fat bloom in a cocoa-based product, wherein the method comprises adding the cocoa shell powder produced according to the process of claim 1 during the manufacture of the cocoa-based product in order to increase resistance of cocoa-based products against fat bloom.

13. A process for producing cocoa shell powder, which comprises the steps of:
   (a) cracking cocoa beans;
   (b) removing and separating cocoa shells from nibs;
   (c) selecting and separating a fraction of cocoa shells;
   (d) grinding the selected fraction of (c);
   (e) washing the ground fraction of (d);
   (f) adding a chelating agent to (e);
   (g) drying the treated cocoa shells of (f); and
   (h) grinding the dried cocoa shells of (g);
   wherein the chelating agent is dissolved in water and comprises an organic acid containing two or three carboxylic groups or any alkali metal salt or alkali earth metal salt thereof;
   wherein the organic acid is tartaric acid or citric acid.

* * * * *